United States Patent
Chu et al.

(10) Patent No.: US 8,373,764 B2
(45) Date of Patent: Feb. 12, 2013

(54) ELECTRONIC DEVICE FOR STITCHING DIFFERENT IMAGES INTO AN INTEGRATED IMAGE AND IMAGE PROCESSING METHOD THEREOF

(75) Inventors: Zheng-Hao Chu, Shenzhen (CN); Wen-Wen Jiang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 83 days.

(21) Appl. No.: 12/980,377

(22) Filed: Dec. 29, 2010

(65) Prior Publication Data
US 2011/0292233 A1 Dec. 1, 2011

(30) Foreign Application Priority Data
May 31, 2010 (CN) .......................... 2010 1 0187167

(51) Int. Cl.
*H04N 5/225* (2006.01)
*H04N 7/00* (2006.01)
*G06K 9/36* (2006.01)

(52) U.S. Cl. ................ 348/218.1; 348/36; 382/284

(58) Field of Classification Search ............... 348/218.1, 348/36–39; 382/284
See application file for complete search history.

(56) References Cited

U.S. PATENT DOCUMENTS

| | | | |
|---|---|---|---|
| 2008/0100697 A1* | 5/2008 | Baker | 348/32 |
| 2009/0208062 A1* | 8/2009 | Sorek et al. | 382/107 |
| 2011/0052093 A1* | 3/2011 | Porter | 382/284 |

\* cited by examiner

*Primary Examiner* — Aung S Moe
*Assistant Examiner* — Mekonnen Dagnew
(74) *Attorney, Agent, or Firm* — Altis Law Group, Inc.

(57) ABSTRACT

An electronic device includes an image capture module, an image processing module, and a display module. The image capture module includes a first capture unit for capturing a first image and a second capture unit for capturing a second image. The first capture unit is simultaneously enabled with the second capture unit. The second image has an overlapping view with the first image. The image processing module includes an image cropping unit and an image stitching unit. The image cropping unit crops the first image to keep a first section of the first image, and further crops the second image to keep a second section of the second image. The first section is different from the second section. The image stitching unit stitches the first section and the second section into an integrated image. The display module displays the integrated image.

15 Claims, 3 Drawing Sheets

ELECTRONIC DEVICE FOR STITCHING DIFFERENT IMAGES INTO AN INTEGRATED IMAGE AND IMAGE PROCESSING METHOD THEREOF

BACKGROUND

1. Technical Field

The present disclosure relates to electronic devices, and especially to an electronic device capable of processing images.

2. Description of Related Art

Electronic devices with built-in cameras such as computer displays are becoming more and more popular. The cameras, however, have a fixed orientation which limits the available field of view, which is inconvenient for users who desire to capture a wide-angle view.

Therefore, there is room for improvement in the art.

BRIEF DESCRIPTION OF THE DRAWINGS

The components of the drawings are not necessarily drawn to scale, the emphasis instead being placed upon clearly illustrating the principles of the embodiments of an electronic device capable of providing image processing. Moreover, in the drawings, like reference numerals designate corresponding parts throughout the views.

DETAILED DESCRIPTION

Embodiments of the present disclosure will now be described in detail with reference to the drawings.

Figure 1:
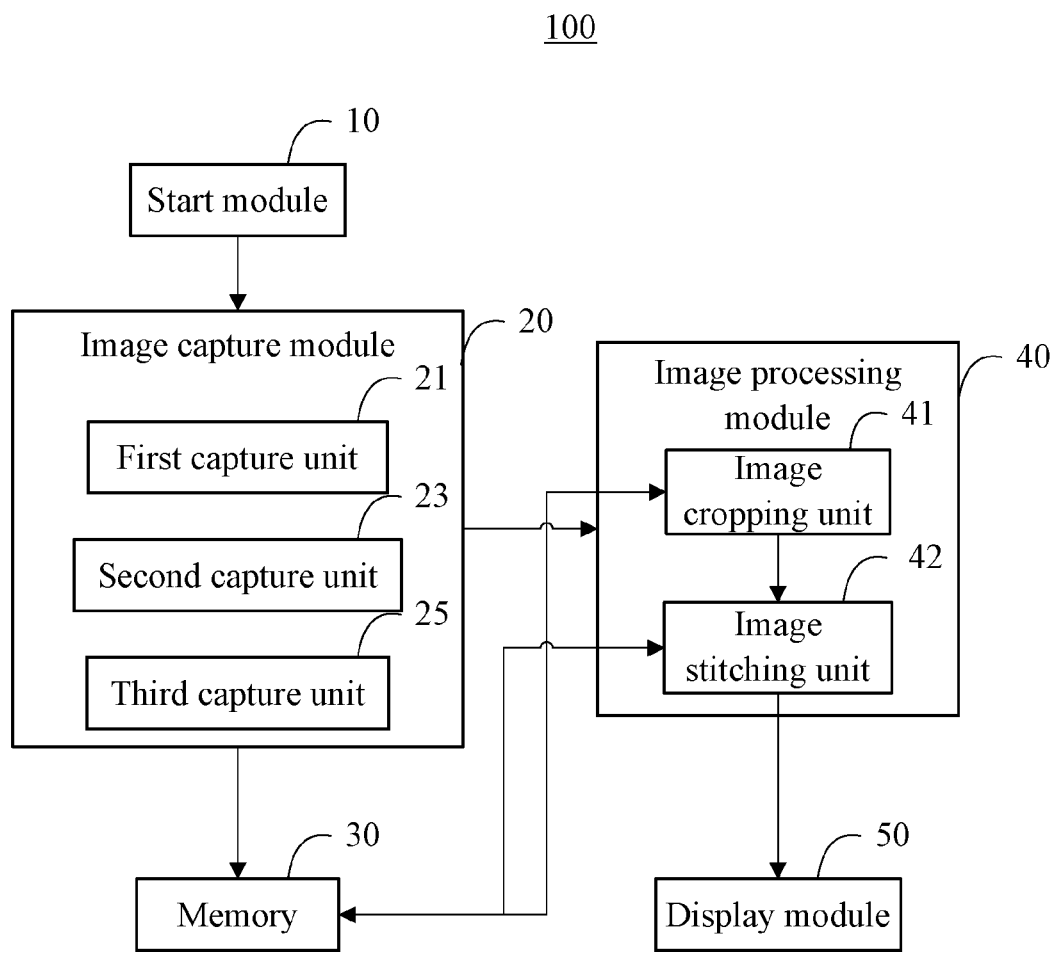
FIG. 1 is a functional block diagram of an electronic device including an image processing module according to an exemplary embodiment.

Referring to FIG. 1, an electronic device 100 according to an exemplary embodiment is illustrated. In this embodiment, the electronic device 100 is a notebook computer. In other embodiments, the electronic device 100 may be, for example, a mobile phone, a MP5 player, or a DVD player. The electronic device 100 includes a start module 10, an image capture module 20, a memory 30, an image processing module 40, and a display module 50.

The start module 10 is used for generating a start signal, which is used for activating the image capture module 20. The start module 10 can be a menu item displayed by the electronic device 100 or a key arranged on the electronic device 100.

The image capture module 20 is used for simultaneously capturing more than one image of an area in view of the image capture module 20 in response to the start signal. The image capture module 20 includes more than one capture unit, such as cameras. In this embodiment, the image capture module 20 includes three capture units: a first capture unit 21, a second capture unit 23, and a third capture unit 25. The three capture units 21, 23, 25 are arranged in the same line, but aimed in different directions, to simultaneously capture images.

Figure 2:
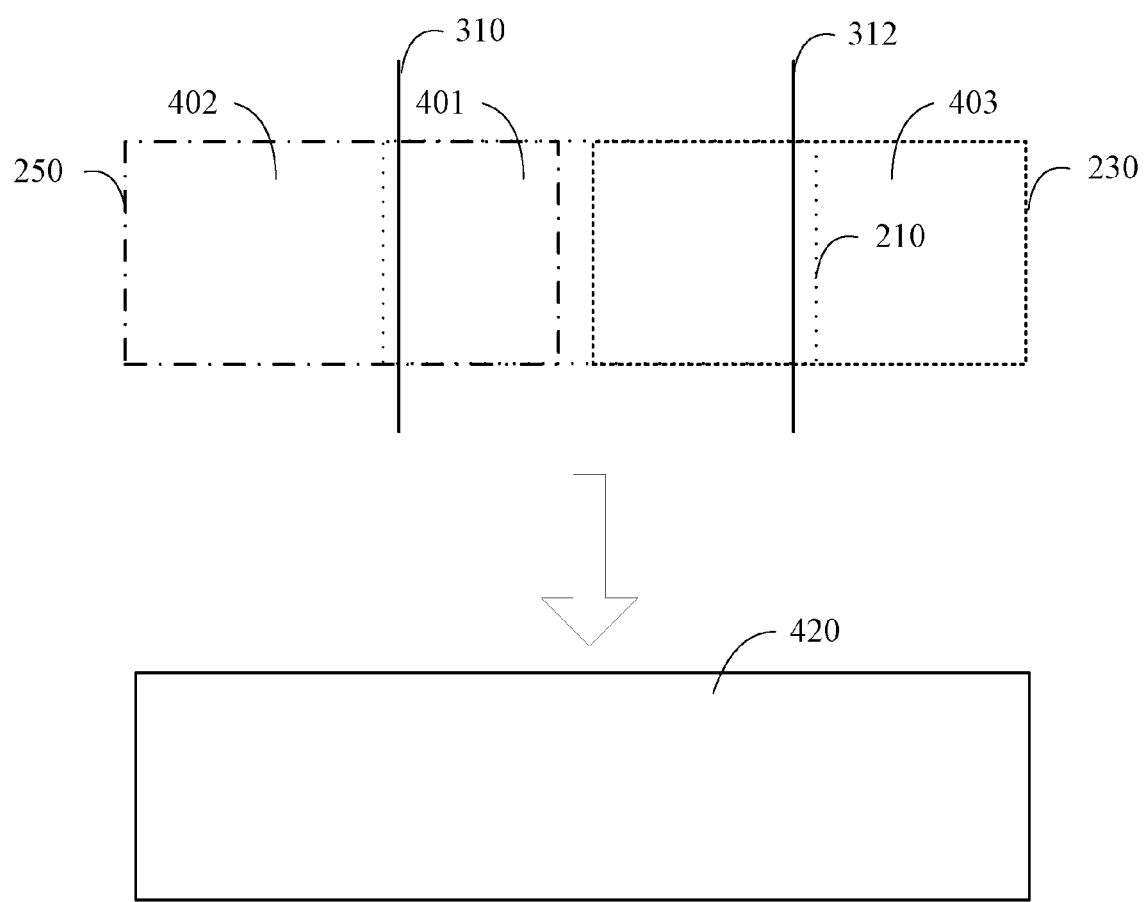
FIG. 2 is a schematic view of working principle of the image processing module of FIG. 1.

Further referring to FIG. 2, the first capture unit 21 is used for capturing a first image 250 of a portion of the combined field of view of the capture units 21-23. The second capture unit 23 is used for capturing a second image 230 of an adjacent portion of the combined field of view. The third capture unit 25 is used for capturing a third image 210 of a portion of the combined field of view which partially overlaps the portions captured in the first image 250 and the second image 230.

The image processing module 40 includes an image cropping unit 41 used for cropping images, and an image stitching unit 42 used to stitch a number of sections together to form a wide-angle or panoramic image.

In this embodiment, the image cropping unit 41 crops the first image 250 according to a first predetermined tag line 310, which is shown on the overlapping view of the first image 250 and the third image 210, and keeps a first section 402, which is on the left of the first predetermined tag line 310.

The image cropping unit 41 also crops the second image 230 according to a second predetermined tag line 312, which is shown on an overlapping part of the second image 230 and the third image 210, and keeps a second section 403, which is on the right of the second predetermined tag line 312.

The image cropping unit 41 further crops the third image 210 according to the first predetermined tag line 310 and the second predetermined tag line 312, and keeps a third section 401, which is between the first predetermined tag line 310 and the second predetermined tag line 312.

The first predetermined tag line 310 and the second predetermined tag line 312 are two virtual lines. The placements of the first predetermined tag line 310 and the second predetermined tag line 312 in the three images 250, 230, 210 are predetermined according to a number of trials. The first predetermined tag line 310 and the second predetermined tag line 312 are stored in the memory 30 and can be defined and redefined by users. In other embodiments, the first predetermined tag line 310 and the second predetermined tag line 312 can be determined by two infrared rays captured by the three capture units 21, 23, 25. The two infrared rays are respectively emitted from two infrared lights set on the electronic device 100.

The image stitching unit 42 stitches the first section 402, the second section 403, and the third section 401 into an integrated image 420. The first section 402 is on the left, the second section 403 is on the right, and the third section 401 is arranged between the first section 402 and the second section 403.

The memory 30 is further used for storing the integrated image 420, the three images 250, 230, 210, and the three sections 402, 403, 401. The display module 50 is used for displaying the integrated image 420.

As discussed above, the integrated image 420 has a wider angle of view. Thus, the view located in front of the electronic device 100 can be shown more in the display module 50.

Figure 3:
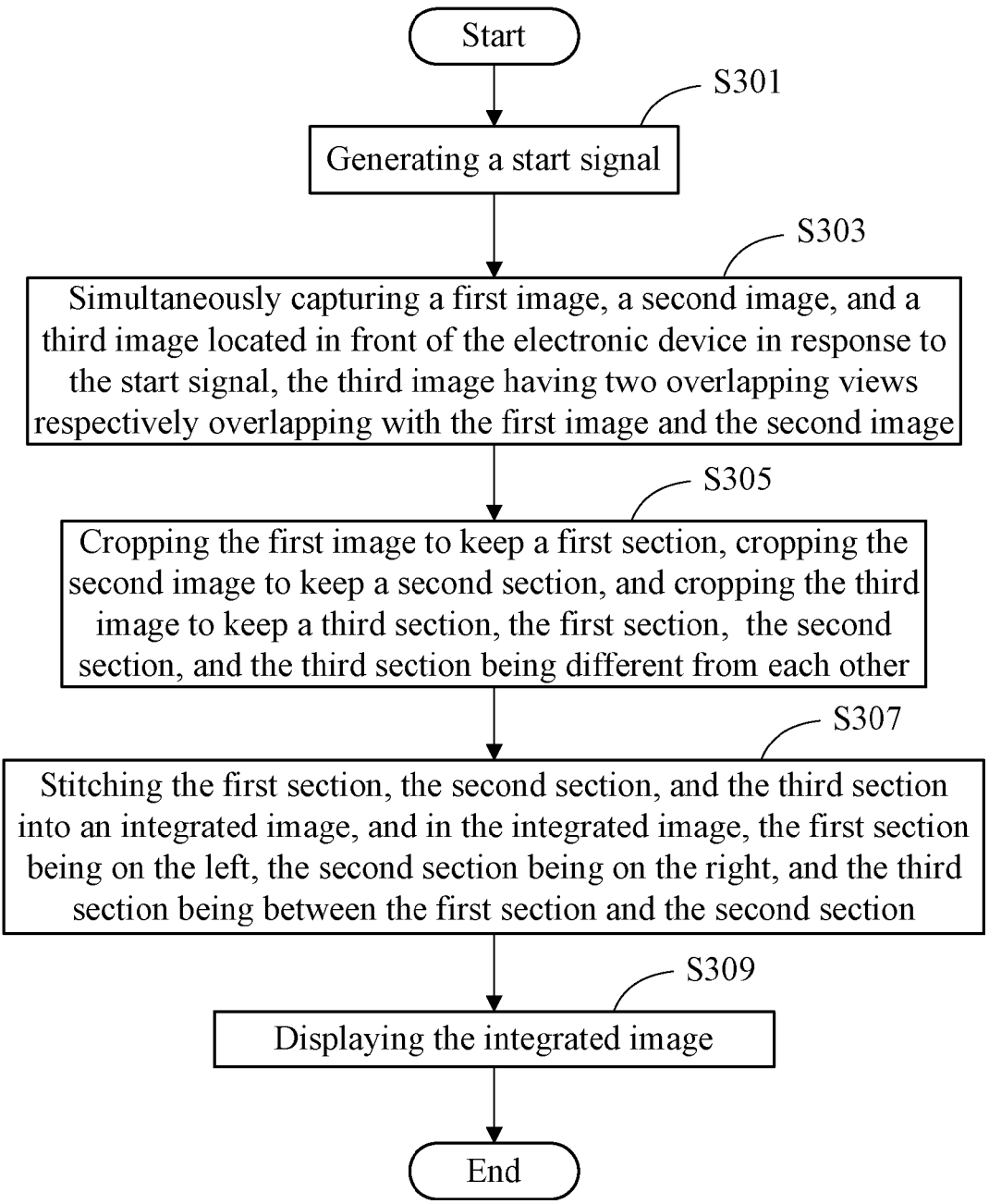
FIG. 3 is a flowchart of an image processing method for an electronic device according to a first exemplary embodiment.

Referring to FIG. 3, an image processing method for an electronic device 100 provides a wide angle of view, as follows.

In step S301, generating a start signal. It is implemented by the start module 10 of the electronic device 100.

In step S303, simultaneously capturing a first image 250, a second image 230, and a third image 210 located in front of the electronic device 100 in response to the start signal, third image 210 having two overlapping views respectively overlapping with the first image 250 and the second image 210. This step is implemented by the three capture units 21, 23, 25 of the image capture module 20.

In step S305, cropping the first image 250 to keep a first section 402, cropping the second image 230 to keep a second section 403, and cropping the third image 210 to keep a third section 401, the first section, the second section, and the third section being different from each other. It is implemented by the image cropping unit 41 of the image processing module 40.

In step S307, stitching the first section 402, the second section 403, and the third section 401 into an integrated image 420, and in the integrated image 420, the first section 402 being on the left, the second section 403 being on the right, and the third section 401 being between the first section 402 and the second section 403. It is implemented by the image stitching unit 42 of the image processing module 40.

In step S309, displaying the integrated image 420. It is implemented by the display module 50 of the electronic device 100. Then the procedure is ended.

As discussed above, the integrated image 420 has a wide angle of view. Thus, the view located in front of the electronic device 100 can be shown more in the display module 50 by using the image processing method.

While various exemplary and preferred embodiments have been described, it is to be understood that the disclosure is not limited thereto. To the contrary, various modifications and similar arrangements (as would be apparent to those skilled in the art) are intended to also be covered. Therefore, the scope of the appended claims should be accorded the broadest interpretation to encompass all such modifications and similar arrangements.

What is claimed is:

1. An electronic device, comprising:
   an image capture module comprising:
      a first capture unit for capturing a first image; and
      a second capture unit for capturing a second image, the first capture unit simultaneously enabled with the second capture unit, the second image having an overlapping view with the first image;
   an image processing module comprising:
      an image cropping unit for cropping the first image to keep a first section of the first image, and further for cropping the second image to keep a second section of the second image, the first section being different from the second section; and
      an image stitching unit to stitch the first section and the second section into an integrated image without the overlapping view; and
   a display module for displaying the integrated image;
   wherein the image capture module further comprises a third capture unit simultaneously enabled with the first capture unit and the second capture unit, the third capture unit is used for capturing a third image, the third image has an overlapping view with the second image; the image cropping unit further crops the third image to keep a third section of the third image; the first section, the second section, and the third section are different from each other; the image stitching unit stitches the first section, the second section, and the third section into another integrated image; the image cropping unit crops the first image according to a first predetermined tag line, which is shown on the overlapping view defined by the first image and the second image, and keeps a first section of the first image, which is on the left of the first predetermined tag line, and also crops the third image according to a second predetermined tag line which is shown on the overlapping view defined by the second image and the third image, and keeps a second section of the third image, which is on the right of the second predetermined tag line, and further crops the second image according to the first predetermined tag line and the second predetermined tag line, and keeps a third section of the third image, which is between the first predetermined tag line and the second predetermined tag line; in the integrated image, the first section is on the left of the second section, the third section is arranged between the first section and the second section.

2. The electronic device of claim 1, wherein the image cropping unit crops the first image according to a first predetermined tag line, which is shown on the overlapping view of the first image, and keeps a first section of the first image, which is on the left of the first predetermined tag line, and further crops the second image according to the first predetermined tag line, which is shown on the overlapping view of the second image, and keeps a second section of the second image which is on the right of the first predetermined tag line, in the integrated image, and the first section are on the left of the second section.

3. The electronic device of claim 2, wherein the predetermined tag line is predetermined according to a number of trials.

4. The electronic device of claim 2, further comprising:
   a memory for restoring the first image, the second image, the first section, the second section, the integrated image, and the predetermined line.

5. The electronic device of claim 1, wherein the first capture unit, the second capture unit, and the third capture unit are arranged in a line, but aimed in different directions, to simultaneously capture images.

6. The electronic device of claim 1, wherein the first predetermined tag line and the second predetermined tag line are predetermined according to a number of trials.

7. An image processing method for an electronic device, the method comprising:
   simultaneously capturing a first image and a second image, the second image having an overlapping view with the first image;
   simultaneously capturing a third image, the third image having an overlapping view with the second image;
   cropping the first image according to a first predetermined tag line which is shown on the overlapping view defined by the first image and the second image to keep a first section of the first image and further cropping the second image according to the first predetermined tag line and the second predetermined tag line to keep a second section of the second image, the first section of the first image being kept from the left of the first predetermined tag line, and the second section of the third image being kept from the right of the second predetermined tag line;
   cropping the third image according to a second predetermined tag line which is shown on the overlapping view defined by the second image and the third image to keep a third section, the third section of the third image being kept between the first redetermined tag line and the second predetermined tag line the first section and the second section, and the third section being different from each other;
   stitching the first section, the second section, and the third section into another integrated image; and
   displaying the integrated image.

8. The method of claim 7, further comprising:
   generating a start signal to activate the step of simultaneously capturing a first image and a second image.

9. The method of claim 7, further comprising:
   cropping the first image according to a first predetermined tag line, which is shown on the overlapping view of the first image, and the first section of the first image being kept from the left of the first predetermined tag line; and
   cropping the second image according to the first predetermined tag line, which is shown on the overlapping view of the second image, and the second section of the second image being kept from the right of the first predetermined tag line.

10. The method of claim 9 wherein in the integrated image, the first section is on the left of the second section.

11. The method of claim 9 wherein the predetermined tag line is predetermined over a number of trials.

12. The method of claim 7, wherein in the integrated image, the first section is on the left of the second section, the third section is arranged between the first section and the second section.

13. The method of claim 7, wherein the first predetermined tag line and the second predetermined tag line are predetermined according to a number of trials.

14. An electronic device, comprising:
an image capture module comprising:
a first capture unit for capturing a first image; and
a second capture unit for capturing a second image, the first capture unit simultaneously enabled with the second capture unit, the second image having an overlapping view with the first image;
a third capture unit simultaneously enabled with the first capture unit and the second capture unit, the third capture unit is used for capturing a third image, the third image has an overlapping view with the second image;
an image processing module comprising:
an image cropping unit for cropping the first image to keep a first section of the first image, and further for cropping the second image to keep a second section of the second image, and further crops the third image to keep a third section of the third image; the first section, the second section, and the third section are different from each other;
an image stitching unit stitches the first section, the second section, and the third section into another integrated image; and
a display module for displaying the integrated image;
wherein the image cropping unit crops the first image according to a first predetermined tag line, which is shown on the overlapping view defined by the first image and the second image, and keeps a first section of the first image, which is on the left of the first predetermined tag line, and also crops the third image according to a second predetermined tag line which is shown on the overlapping view defined by the second image and the third image, and keeps a second section of the third image, which is on the right of the second predetermined tag line, and further crops the second image according to the first predetermined tag line and the second predetermined tag line, and keeps a third section of the third image, which is between the first predetermined tag line and the second predetermined tag line; in the integrated image, the first section is on the left of the second section, the third section is arranged between the first section and the second section.

15. The electronic device of claim 14, wherein the first predetermined tag line and the second predetermined tag line are predetermined according to a number of trials.

* * * * *